United States Patent [19]

Marcade et al.

[11] 3,708,721
[45] Jan. 2, 1973

[54] ELECTRICAL CONNECTION AND GROUND MONITOR

[75] Inventors: Roque D. Marcade, Stevensville; Donald E. Janke, Benton Harbor, both of Mich.

[73] Assignee: Whirlpool Corporation, Benton Harbor, Mich.

[22] Filed: Feb. 29, 1972

[21] Appl. No.: 230,348

[52] U.S. Cl. .................... 317/18 B, 317/31, 317/45, 340/256
[51] Int. Cl. ............................................ H02h 3/14
[58] Field of Search ..... 340/256; 317/18 A, 18 B, 31, 317/45; 324/51

[56] References Cited

UNITED STATES PATENTS

| 2,999,189 | 9/1961 | Gerrard | 317/18 B |
|---|---|---|---|
| 3,611,053 | 10/1971 | Rowell | 317/18 B |

*Primary Examiner*—James D. Trammell
*Attorney*—James S. Nettleton

[57] ABSTRACT

An electrical connection and ground monitor for ensuring proper electrical connection of an appliance to a grounded power supply. The appliance may have a control responsive to the selective provision of a logic 0 or a logic 1 input signal thereto for causing the appliance to be selectively correspondingly in "On" or "Off" operational conditions. The electrical connection and ground monitor may include an electrical component means for developing a predetermined voltage in response to a potential of one polarity thereacross and substantially no voltage in response to a voltage of opposite polarity thereacross. The signal may be developed across the voltage responsive electrical component for controlling the operation of the device. The appliance control may comprise an integrated circuit means and the voltage responsive electrical component may comprise a Zener diode for providing the desired logic input signal to the integrated circuit control.

14 Claims, 8 Drawing Figures

PATENTED JAN 2 1973 3,708,721
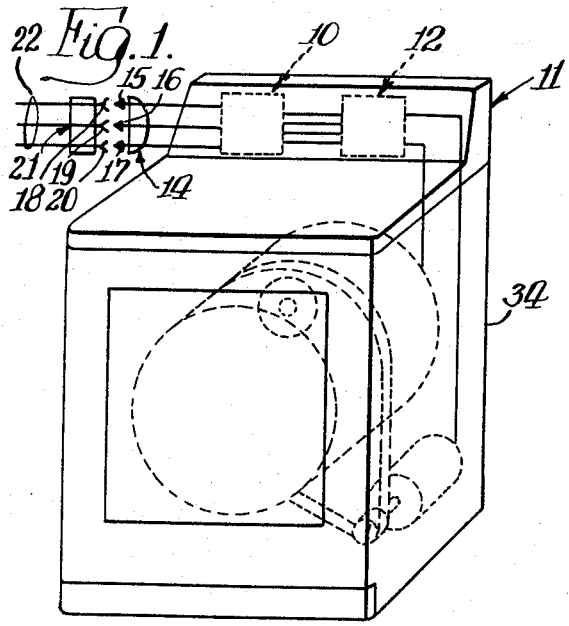
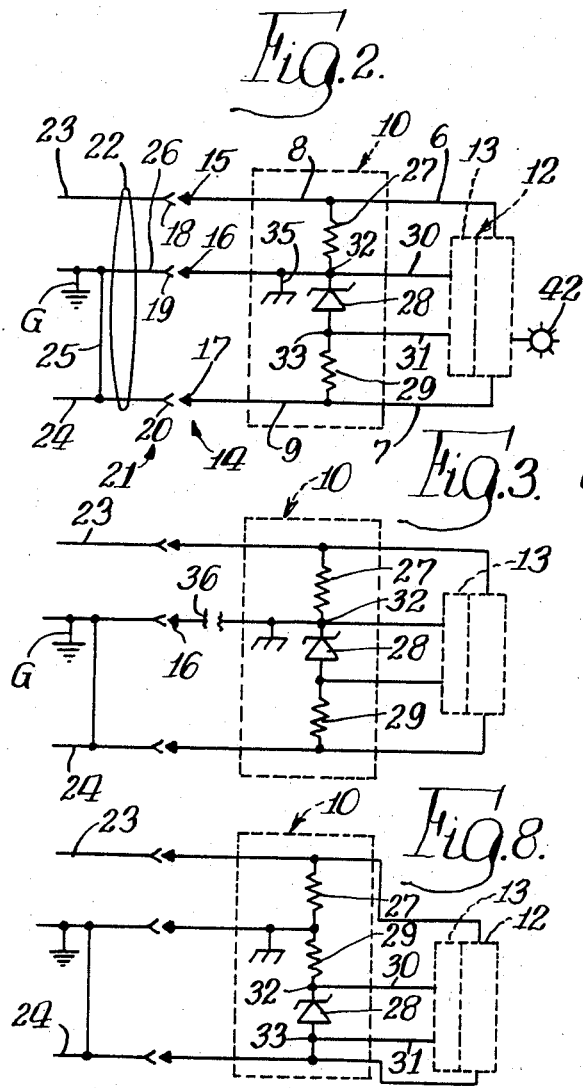
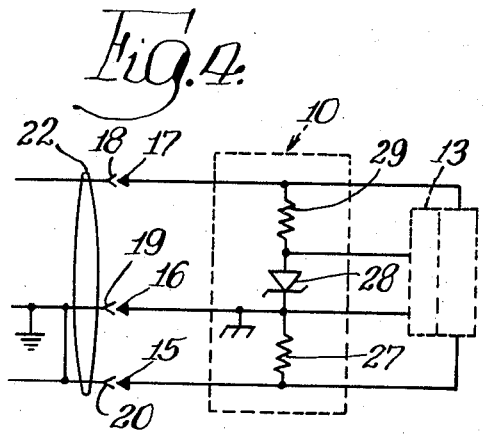
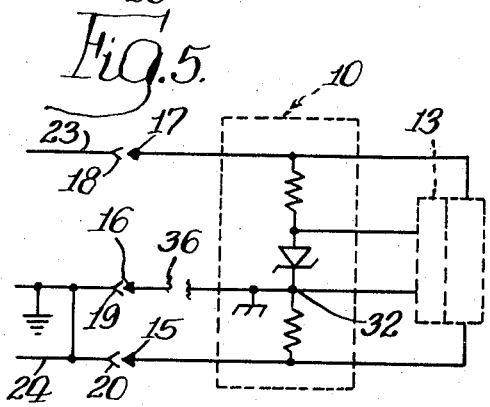
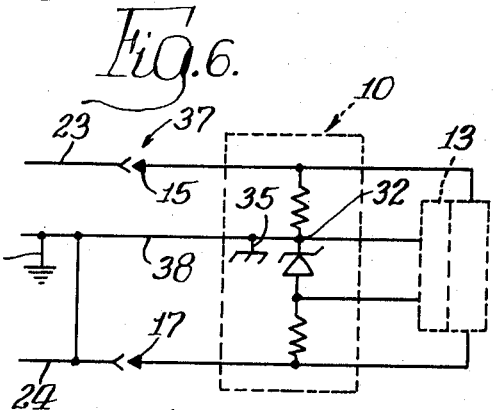
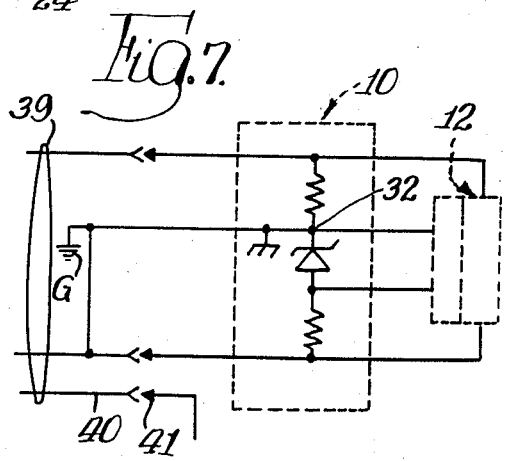

ELECTRICAL CONNECTION AND GROUND MONITOR

BACKGROUND OF THE INVENTION

1. Field of the Invention

This invention relates to electrical controls and in particular to an electrical connection and ground monitor for providing improved safety in the operation of a device, such as an appliance, from a grounded power supply, such as a conventional three-wire 110-volt alternating current household power supply.

2. Description of the Prior Art

It is conventional to provide for operating conventional load devices, such as appliances and the like, a grounded multi-conductor power supply. Conventionally, such a power supply may be defined by three leads including a first lead at a potential alternating above and below ground potential, a second lead maintained at ground potential, and a third neutral lead which is conventionally also connected to ground. Ground connection means have been provided in the electrical connections for connecting such devices electrically to such power supplies, including special prong arrangements, assuring that a grounded connection be made between the connector plug and the female connector means of the power supply.

Further, controls have been developed for disconnecting the load device from the power supply in the event of a failure of the ground connection. Illustratively, such an electrical safety circuit is shown in the United States Letters Patent of C. J. Rogers, Sr., No. 3,450,947. This circuit utilizes a pair of half-wave rectifiers connected in the load line conductors. A contactor is provided for sensing a ground fault and disconnecting the load from the power source as a result thereof.

In the United States Letters Patent No. 3,407,336 issued to R. R. Embree, a device for detecting the absence of a ground and protecting the load as an incident thereof includes a rectifier bridge and a relay connected between one terminal of the bridge and a ground prong of the load male device connector plug. The device includes an indicator lamp for showing the nongrounded condition.

K. Clough U.S. Pat. No. 2,917,705 discloses a safety tester for indicating a short between the load appliance and a case portion thereof. M. C. Gerrard U.S. Pat. No. 2,999,189 discloses a safety device for protecting an apparatus and a user from danger arising through incorrect connection of the apparatus to a power supply or through a fault developing in the leads to the apparatus or in the apparatus itself. The Gerrard device utilizes a bridge circuit and a relay connected across the bridge for opening the circuit to the load in the event that the main supply connections are faulty and more specifically, if a fault develops in the earth connection.

SUMMARY OF THE INVENTION

The present invention comprehends an improved electrical connection and ground monitor device which is extremely simple and economical of construction and which provides an improved control of the input circuit of the load electrical control means so as to prevent operation of the load in the event that the load is not properly grounded, such as by a failure to provide a ground connection through the connector means and power supply leads. Further, the electrical connection and ground monitor prevents operation of the load appliance in the event that the connection to the power supply is reversed so that the ground of the appliance is connected to the high side line.

The electrical connection and ground monitor device is adapted for use with loads having an integrated circuit input suitable to be controlled by selective logic 0 and logic 1 signals for causing the load device to be correspondingly selectively in an operational "On" or an operational "Off" condition. The electrical connection and ground monitor device is extremely simple and economical of construction, herein comprising a simple series connection of resistive means, and an electrical component means for developing a predetermined voltage in response to a potential of one polarity thereacross and substantially no voltage in response to a potential of opposite polarity thereacross. In the illustrative embodiment, the electrical component means comprises a Zener diode and the resistive elements comprise resistors which may be of relatively low wattage rating and, thus, of low cost.

More specifically, the control device of the present invention is arranged for providing, from an alternating current power supply having a hot line, a neutral line, and a ground, selectively a logic 0 or a logic 1 input signal to a high impedance input of a control arranged to be selectively in an "On" or an "Off" operational condition as an incident of the selective delivery of the input logic signal thereto. The illustrative control device includes a series connection of electrical elements including a first resistor, a Zener diode, and a second resistor, and means for connecting the hot line of the power supply to one end of the series connection, the neutral line of the power supply to the opposite end of the series connection, the ground to a connection point between a pair of the electrical elements, and the input of the control in parallel with the Zener diode, the series connection providing a logic signal across the Zener diode suitable to cause the control to be in the "Off" operational condition selectively when said connection point is not properly grounded and/or when the hot line and neutral line are reversely connected to the opposite end and the one end of the series connection, respectively.

The control device may be readily utilized with existing load device controls as it comprises a simple, low cost circuit which may be readily interconnected to the input leads of the load control to provide the desired improved operation thereof as discussed above.

BRIEF DESCRIPTION OF THE DRAWING

Other features and advantages of the invention will be apparent from the following description taken in connection with the accompanying drawing wherein:

FIG. 1 is a schematic perspective view of an appliance having an electrical connection and ground monitor device embodying the invention associated therewith;

FIG. 2 is a schematic electrical wiring diagram thereof;

FIG. 3 is a schematic electrical wiring diagram thereof showing an open ground condition;

FIG. 4 is a schematic electrical wiring diagram thereof showing a reversed polarity power supply connection;

FIG. 5 is a schematic electrical wiring diagram showing an open ground condition and a reversed polarity power supply connection;

FIG. 6 is a schematic electrical wiring diagram showing the connection of the device to a two-wire power supply;

FIG. 7 is a schematic wiring diagram showing the connection of the device to a 220-volt alternating current three-wire power supply;

FIG. 8 is a schematic wiring diagram of a modified form of the electrical connection and ground monitor.

DESCRIPTION OF THE PREFERRED EMBODIMENTS

In the exemplary embodiment of the invention as discussed in the drawing, an electrical connection and ground monitor device generally designated 10 is shown to be provided in connection with a load 11 illustratively comprising a household appliance, and more specifically, a clothes dryer. The appliance 11 includes a control 12 for automatically controlling the operation of the dryer in a conventional manner. The control 12 may comprise an integrated circuit control having a D.C. power supply. The control 12 may also have a section 13 defining the input portion of the control. Such controls are well known in the prior art and define logic controlled input means for causing the appliance to be selectively in an operational "On" or an operational "Off" condition corresponding to the selective logic input signal delivered thereto. In illustrating the present invention, it will be considered that a logic 0 signal delivered to the input portion 13 effects an "On" operational condition of the appliance and a logic 1 signal effects an "Off" operational condition thereof. It should be understood, however, that a reverse logic arrangement may be utilized by suitable alteration of the input control portion 13.

As indicated briefly above, the device 10 comprises an electrical control device preventing operation of the appliance 11 whenever a reverse polarity or ungrounded electrical connection of the appliance is made. Thus, as shown in FIG. 2, the device 10 may include a male connector 14 having prongs 15, 16 and 17 adapted to engage suitable female receptacles 18, 19 and 20, respectively, of a female connector 21 connected to a power supply 22.

As shown in FIG. 2, the power supply 22 may include a first, high side line 23 having a potential alternating above and below ground potential, such a power supply line conventionally being referred to as the "hot" line of the power supply. The opposite side of the power supply is defined by a neutral line 24 which is conventionally connected to ground G by suitable ground interconnector 25. The power supply 22 may further include a third, ground wire 26 also connected to the ground G.

As shown in FIG. 2, device 10 herein comprises a simple series circuit arrangement of a first resistive element 27, an electrical component 28 arranged to develop a predetermined voltage thereacross in response to a potential of one polarity impressed thereacross, and substantially no voltage in response to a potential of opposite polarity impressed thereacross. Illustratively, the component 28 may comprise a Zener diode of suitable preselected voltage characteristics. The series circuit further includes a second resistive element 29 and in the preferred embodiment of the invention as shown in FIG. 2, the Zener diode 28 is connected between the two resistors 27 and 29 which are connected to the male connectors 15 and 17 through leads 8 and 9 so as to be connected in series across power supply leads 23 and 24 when the male connector 14 is suitably connected to the female connector 21. The control 12 is connected in parallel to the series circuit through leads 6 and 7 so as to be connected across power supply leads 23 and 24. A signal to input portion 13 of the control is provided by means of a pair of leads 30 and 31 connected respectively to a first point 32 between resistor 27 and Zener diode 28 and a second point 33 between Zener diode 28 and resistor 29. Point 32 is connected to male prong 16 and is grounded such as to the cabinet 34 of the appliance by a suitable ground connection 35.

In the illustrative embodiment, the Zener diode 28 may comprise a 27-volt Zener diode. The input resistance of control 12 is preferably relatively high, such as in the order of at least approximately 100 megohms, whereby the resistors 27 and 29 may have a resistance impedance of at least approximately 1 megohm. Thus, the resistors may be extremely low wattage resistors while yet providing the desired accurate control of the appliance control 12. Further, the high ohmic value of the resistors causes the current leakage therethrough to the cabinet ground 35 to be extremely small. In the illustrative embodiment, a negative voltage across the Zener diode 28 corresponds to a logical 1 input to the input portion 13 and an "Off" condition of the control 12. The first negative voltage pulse from the power supply 22 across diode 28 delivered through leads 30 and 31 to the input portion 13 of control 12 resets the control to the "Off" condition.

As shown in FIG. 2, when the appliance is connected properly to the power supply 22 with the ground connection properly maintained, no voltage is developed across the Zener diode 28 as a result of the direct connection of point 32 to ground G, thereby effectively shorting the diode. At this time, the current flow through device 10 is substantially only through resistor 27 between power supply lead 23 and ground. Under these conditions, a logic 0 signal is delivered to the input portion 13 of control 12 permitting the appliance to operate in the normal manner.

Referring now to FIG. 3, should a break occur in the connection of point 32 to ground, such as a break 36 between point 32 and male prong 16, the Zener diode 28 is no longer shorted out but is connected in series with resistors 27 and 29 across power supply leads 23 and 24. Thus, a negative voltage is developed across the Zener diode 28 every other half cycle providing a logic 1 input signal to the control portion 13, thereby preventing operation of the appliance.

Should the connections to the power supply 22 be reversed, as shown in FIG. 4, so that male prong 17 is connected to female receptacle 18 and male prong 15 is connected to female receptacle 20, a negative voltage is similarly developed across the Zener diode 28 through high side line 23, resistor 29 and male prong 16 to ground every half cycle to provide an "Off" condition signal to the input portion 13 of control 12, thereby preventing operation of the appliance. Similarly, under the reverse arrangement, should a break 36 occur in the connection between point 32 and male prong 16 (FIG. 5), the Zener diode is connected with the resistors in series across the power supply leads 23 and 24 to provide a negative voltage pulse every other half cycle to cause the control 12 to prevent operation of the appliance by the arrangement thereof in the "Off" operating condition.

Turning now to FIG. 6, the device 10 is connected to a two-wire plug generally designated 37 wherein no round male prong is provided, but with male prongs 15 and 17 providing the connection of the appliance to the power supply leads 23 and 24. In this arrangement, the cabinet ground 35 is directly connected to the ground G by a suitable connector 38. Illustratively, connector 38 may connect the cabinet 34 directly to a water pipe or the like at the installation site so as to effectively provide the connection of point 32 of the control to ground G. The operation of device 10 when so connected, as shown in FIG. 6, is identical to the operation thereof when connected through the three-element connectors 14 and 21, as shown in FIG. 2.

In FIG. 7, the device 10 is shown as connected to a 220-volt alternating current, three-wire power supply 39. The load control 12 is wired through the device 10, however, in a manner identical to the wiring thereof to the 110-volt power supply of FIG. 6, as the third wire 40 of the 220-volt wire supply is not utilized in controlling the operation of the appliance. Thus, the male prong 41 is not connected to the device 10 and the point 32 may be directly connected to ground G as discussed above relative to the arrangement of FIG. 6.

In describing the circuit of device 10, the Zener diode 28 has been disclosed as being connected between the resistors 27 and 29. As shown in FIG. 8, however, the Zener diode 28 may alternatively be connected between the power supply lead 24 and one of the resistors 29 with the other resistor 27 being connected in series with the first resistor 29 and the other power supply lead 23. In this arrangement, the input leads 30 and 31 are connected similarly to the points 32 and 33 on opposite sides of the diode 28 to provide an input signal to the input portion 13 of control 12 in a similar manner to the input signal provided in the arrangement of the device as shown in FIG. 2.

Upon removal of the break 36 in the ground connections in the different circuit arrangements discussed above, the fault in the input to the appliance is removed and, thus, the appliance may operate under the normal control of control 12. Similarly, upon reconnection of the device from a reversed connection to the correct desired connection, such as shown in FIG. 2, the control 12 will again be potentiated for normal operation of the appliance. The device 10 is extremely simple and economical of construction utilizing low cost components such as resistors 27 and 29 and Zener diode 28. If desired, Zener diode 28 may be incorporated directly in the integrated circuit 12 with only the two resistors 27 and 29 comprising additional components for providing the desired electrical connection and ground monitor functioning.

As will be obvious to those skilled in the art, any suitable means may be associated with control 12 for indicating a defective connection. Illustratively in FIG. 2, a signal lamp 42 may be provided to provide a visual indication thereof. As discussed above, the assurance of the proper polarity connection of the appliance is effectively independent of the presence or absence of a proper ground in the system so that each of the two functions of the device 10 is provided independently of or conjointly with the other. Thus, not only must the appliance be connected to have the proper polarity relative to the hot line and neutral line, but also, a proper ground connection must be made before the appliance can be operated by the user.

The foregoing disclosure of specific embodiments is illustrative of the broad inventive concepts comprehended by the invention.

We claim:

1. In an appliance having a control and receiving power from an alternating current source having a first lead at an alternating current potential and a second lead at ground potential, an electrical connection and ground monitor circuit comprising:
    a series electrical connection of a first resistive element, a second resistive element, and a component means for developing a predetermined voltage in response to a potential of one polarity across said component means and essentially no voltage in response to a potential across said component means of opposite polarity;
    means at one end of said series connection for electrical connection thereof to said first power lead;
    means at the other end of said series connection for electrical connection thereof to said second power lead;
    means for electrically connecting said control across said component means; and
    means for providing an electrical ground connection from an earth ground to a point in said series connection of said resistive elements and component means such that said ground connection is electrically connected through said first resistive element to said first lead and through said second resistive element and said component means to said second lead.

2. The circuit of claim 1 wherein said component means comprises a Zener diode.

3. The circuit of claim 2 wherein said Zener diode is connected between said resistive elements.

4. The circuit of claim 2 wherein said Zener diode is connected between said second resistive element and said second lead.

5. In an appliance receiving power from an alternating current power supply having a hot line, a neutral line, and a ground, a device for selectively providing a logic 0 or a logic 1 input signal to a high impedance input of a control arranged to be selectively in an "On" or an "Off" operational condition as an incident of the selective delivery of said input logic signals thereto, said device comprising:
    a series connection of electrical elements including a first resistor, a Zener diode, and a second resistor; and
    means for connecting the hot line of the power supply to said first resistor at one end of the series connection, the neutral line of the power supply to the opposite end of the series connection, the ground to a connection point between said first resistor and said Zener diode and second resistor, and the control input across said Zener diode, said series connection providing a logic signal across said Zener diode suitable to cause said control to be in the "Off" operational condition selectively when said connection point is not properly grounded and/or when the hot line and neutral lines are reversely connected to said opposite end and said one end of the series connection respectively.

6. The control device of claim 5 wherein said control comprises a solid state control.

7. The control device of claim 5 wherein said control comprises an integrated circuit control.

8. The control device of claim 5 wherein said high impedance input has an impedance of at least approximately 100 megohms and said first and second resistors have an impedance of at least approximately 1 megohm.

9. The control device of claim 5 wherein said Zener diode is connected between said first and second resistors.

10. The control device of claim 5 wherein said Zener diode is connected between said second resistor and said neutral line.

11. An electrical connection monitor device comprising:
   a first resistive element having an impedance of over approximately 1 megohm;
   a second resistive element having an impedance of over approximately 1 megohm;
   signal means for providing a preselected voltage output as an incident of a potential applied thereto having a preselected polarity and substantially a no voltage output when the potential applied thereto is of opposite polarity; and
   means connected to said resistive elements and signal means for connecting said resistive elements and said signal means in electrical series across an alternating current power supply and providing an output control signal developed across said signal means.

12. The electrical connection monitor of claim 11 wherein said signal means comprises a Zener diode.

13. The electrical connection monitor of claim 11 wherein said signal means is connected between said resistive elements.

14. The electrical connection monitor of claim 11 wherein said resistive elements are connected directly to each other and said signal means is connected to only one of said resistive elements.

* * * * *